Nov. 17, 1931.   M. C. HONEYWELL   1,832,462
METHOD OF AND APPARATUS FOR HEATING MULTIAPARTMENT BUILDINGS
Filed March 17, 1930   2 Sheets-Sheet 1
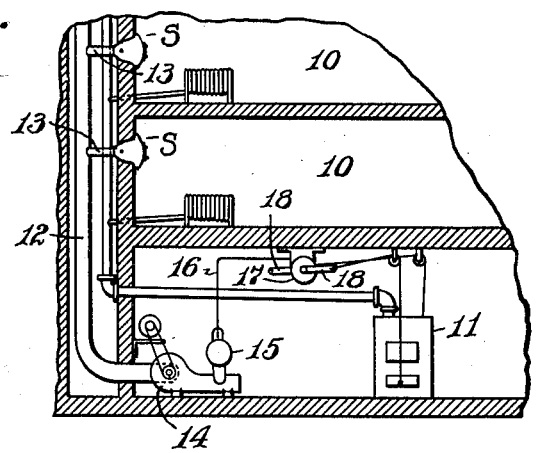
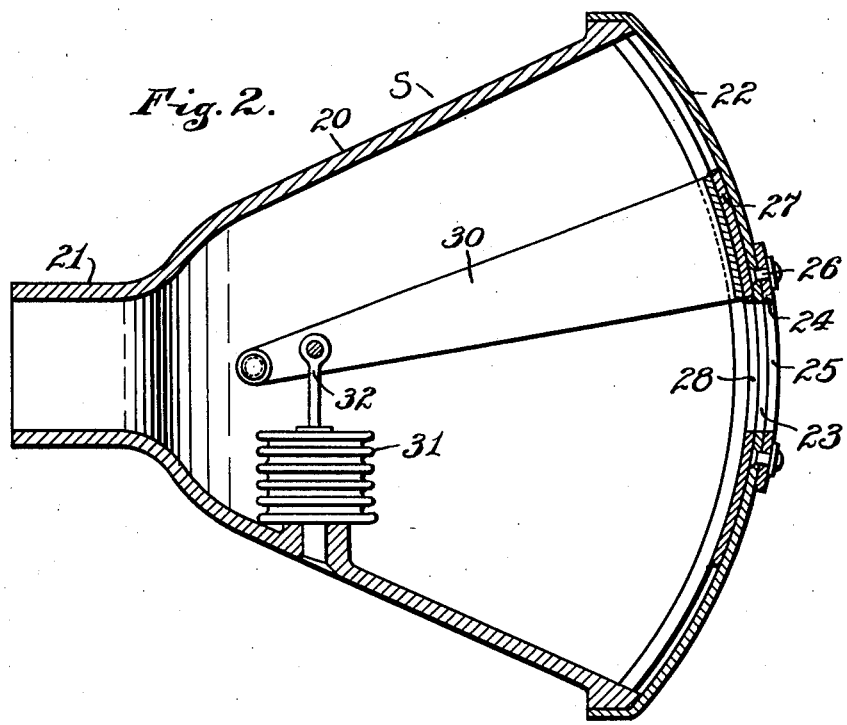
INVENTOR.
Mark C. Honeywell,
BY
Hood & Hahn.
ATTORNEYS Nov. 17, 1931. M. C. HONEYWELL 1,832,462
METHOD OF AND APPARATUS FOR HEATING MULTIAPARTMENT BUILDINGS
Filed March 17, 1930    2 Sheets-Sheet 2
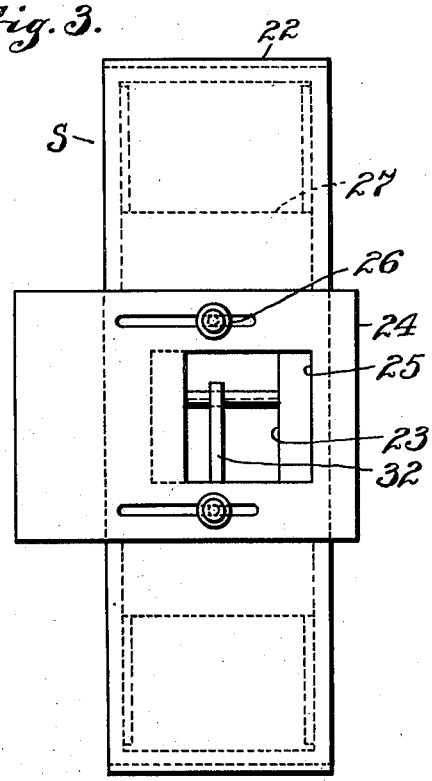
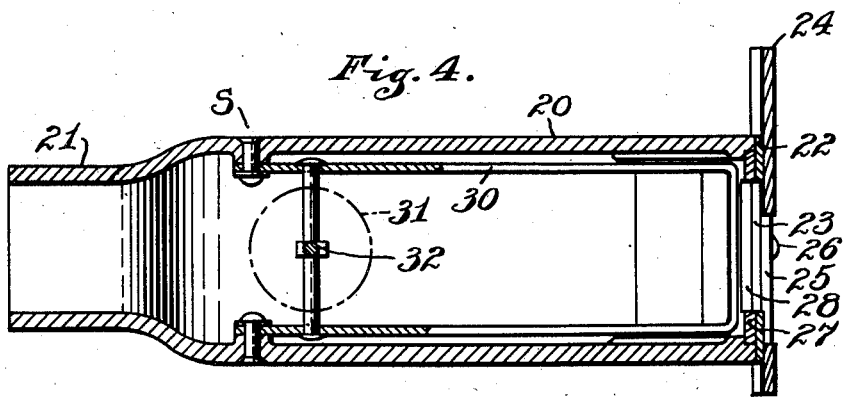
INVENTOR.
Mark C. Honeywell,
BY
Hood & Hahn.
ATTORNEYS Patented Nov. 17, 1931

1,832,462

UNITED STATES PATENT OFFICE

MARK C. HONEYWELL, OF WABASH, INDIANA, ASSIGNOR TO MINNEAPOLIS HONEYWELL REGULATOR COMPANY, OF WABASH, INDIANA, A CORPORATION OF DELAWARE

METHOD OF AND APPARATUS FOR HEATING MULTIAPARTMENT BUILDINGS

Application filed March 17, 1930. Serial No. 436,351.

My invention relates to the automatic control of a central heating plant in accordance with a mean or average temperature of a plurality of rooms within the heating influence of the plant. The object of the invention is to provide means by which the effect of the temperature in each room upon the automatic control apparatus may be automatically adjustably proportioned in such manner that extreme variations of temperature of any region may not have too great a dominating effect upon the heating plant.

My invention as herein disclosed is particularly applied to that type of installation in which air, drawn from a plurality of rooms within the heat influence of the central plant, is intermixed and then directed against a temperature-responsive device which in turn controls the heating plant.

In carrying out my invention I provide adjustable limiting or restricting devices (preferably temperature-responsive), one for each of a plurality of rooms, by means of which the relative effects of the temperature conditions in the several control rooms may be apportioned to the desired extent.

The accompanying drawings illustrate my invention.

Fig. 1 is a partial diagrammatic section of a multi-room building equipped with my invention;

Fig. 2 is an axial section of a station shutter device which is both thermostatically and manually adjustable;

Fig. 3 is a front elevation of the parts shown in Fig. 2, and

Fig. 4 is a medial section in a plane at right angles to the plane of Fig. 2.

In the drawings 10, 10 indicate a plurality of rooms within the heating influence of a central heating plant 11. An air duct 12, having branches 13, 13, etc., connecting with the several rooms 10, 10, leads to a suction device 14, which is preferably continuously operated during the normal operation of the apparatus and is of any suitable type capable of extracting air from the several rooms and directing the mixture against a thermostatic device 15 of any well-known construction. In the drawings this thermostatic device 15 is diagramatically indicated as of the electrical type connected by a cable 16 with a damper motor 17 having the usual control arms 18, 18 for operating the dampers of the heater 11, in a well-known manner. The inlet of each branch duct 13 is guarded by an adjustable shutter device S.

It will be readily understood that if, instead of a plurality of relatively small rooms to be heated, there is one very large room, such as an auditorium or exhibition hall, the branches 13 might have their inlet ends in widely separated portions of the large room and I wish it to be understood that, in using the term "plurality of rooms" I have such an arrangement in mind as being within the purview of this application.

The device S comprises a shell 20 having a tubular extension 21 adapted to be associated with the inlet end of one of the branch ducts 13. An arc-shaped plate 22 covers the inlet end of casing 20 and is provided with a central opening 23 having approximately the cross-sectional area of extension 21. Mounted on the outer face of plate 22 is a manually-adjustable damper 24 having an opening 25 registrable with opening 23. This damper may be adjustably held in position by any suitable means as for instance the pin and slot connection 26 or any other suitable mounting by means of which the damper 24 may be adjusted manually to vary the effective inlet opening into casing 20.

Slidably mounted across the inner face of plate 22 is a damper plate 27 perforated at its middle at 28, said perforation 28 being registrable with opening 23 and plate 27 being capable, by movement in either direction from its middle position where perforation 28 registers with perforation 23, of decreasing the effective inlet value of opening 23 as modified by the adjustment of plate 24.

Plate 27 is to be automatically shifted in accordance with the temperature conditions in a particular room, or at a particular point in a room and it will be readily understood that any well-known temperature-responsive means may be provided for this purpose. In Figs. 2 and 4 I have indicated diagrammatically such a mechanism, comprising the swinging arms 30 to which plate 27 is secured, the temperature-responsive element 31 and the connection 32 between said element 31 and arms 30. It will be readily understood that the element 31 may be of such character as to be responsive to a temperature immediately adjacent casing 20, i. e., the stream of air flowing in through openings 25—23—28, or at some other point, depending upon the character of the complete element 31. For instance, element 31 being a responsive bellows, its interior may be connected to a tube, in a well-known manner, said tube and bellows containing a highly expansive fluid and the tube being carried to a desired point of temperature control.

In operation the several dampers 24 and 27 will be so adjusted that with desired normal temperatures in each room the fan 14 will continuously draw from each room a stream of air, properly proportioned to the other streams being drawn from the other rooms that temperature variation in any room from desired normal will so affect the temperature of the air mixture arriving at thermostat 15 as to cause desired control of the central heating unit to tend to restore the normal temperature conditions in the room in which there has been a departure from normal. It is conceivable, however, that temperature conditions in any one room may depart suddenly so far from normal as to undesirably affect thermostat 15. For instance, the occupant in some room may open the windows wide in extremely cold weather. This would tend to cause a stimulation of the central heating unit to such an extent as to unduly heat the other rooms, and dampers 27 are provided to meet this condition. As the temperature conditions in any one room vary from normal, in either direction, the thermo-responsive element 31 will shift the damper plate 27 so as to decrease the effective area of opening 23—25 and, upon sufficient departure from normal, to entirely close said opening, thereby temporarily shutting off the particular room from effective relationship with thermostat 15. It will of course be readily understood that by modifying plate 27 the effect of temperature departures in any one room may be determined in accordance with the results desired.

My invention therefore comprises five fundamental instrumentalities:

1 A heating plant, the heating effectiveness of which may be controlled and supplying a plurality of separated space-heating elements;

2 Means by which the heating effectiveness of the heating plant may be controlled (such for instance as damper control mechanism or fuel feed control);

3 Means by which there may be obtained an average of the temperature conditions in a plurality of spaces heated by the heating plant (in the mechanism shown the means for abstracting concurrent volumes of air from the various heated spaces);

4 Means responsive to the obtained average temperature condition for automatically controlling element 2 (the thermostat 15 and parts controlled thereby for controlling element 2); and 5 The plurality of means, one for each of the heated spaces, for automatically determining the current contribution of each heated space in the current determination of the temperature average.

I claim as my invention:

1. The combination with a heating plant and a plurarlity of space-heating means supplied thereby, or manipulating means associated with said heating plant for varying the heat effectiveness thereof relative to said plurality of space-heating means, temperature-responsive means for controlling said manipulating means, and means for obtaining a temperature average of a plurality of the heated spaces and for impressing such temperature average upon said temperature-responsive means comprising a plurality of temperature - responsive instrumentalities, one for each of said heated spaces, each automatically varying its contributory effectiveness to the temperature-average in accordance with its local temperature environment.

2. The combination with a heating plant and a plurality of space-heating means supplied thereby, of manipulating means associated with said heating plant for varying the effectiveness thereof relative to said plurality of space-heating means, temperature-responsive means for controlling said manipulating means, means for abstracting air from a plurality of heated spaces and delivering a mixture thereof to said temperature-responsive means, and a plurality of temperature-responsive means, one for each heated space for varying the amount of air abstractable from its heated space in accordance with local temeprature conditions.

3. In combination with a heating plant and a plurality of space-heating means supplied thereby, of manipulating means associated with said heating plant for varying the heat effectiveness thereof relative to said space-heating means, temperature-responsive means for controlling said manipulating means, and means for obtaining a temperature average of a plurality of the heated spaces comprising a branched duct leading from said plurality of said heated spaces to the temperature-responsive means, and means for creating a flow of air therethrough toward said temperature-responsive means, a plurality of dampers each associated with one of the branches of said duct, and a plurality of temperature-responsive means, each associated with one of said dampers to position the same to vary the effectiveness of its branch inlet in accordance with local temperature conditions.

In witness whereof, I MARK C. HONEYWELL have hereunto set my hand at Wabash, Indiana, this 13th day of March, A. D. one thousand nine hundred and thirty.

MARK C. HONEYWELL.